No. 624,582. Patented May 9, 1899.
J. TUCKER.
SULKY ATTACHMENT FOR HARROWS.
(Application filed Nov. 23, 1896.)

(No Model.) 2 Sheets—Sheet I.

Witnesses. Inventor.

No. 624,582. Patented May 9, 1899.
J. TUCKER.
SULKY ATTACHMENT FOR HARROWS.
(Application filed Nov. 23, 1896.)

(No Model.) 2 Sheets—Sheet 2.

Witnesses.
B. F. Goerke
Ed. H. Goerke.

Inventor.
Joseph Tucker

UNITED STATES PATENT OFFICE.

JOSEPH TUCKER, OF JULIAN, NEBRASKA.

SULKY ATTACHMENT FOR HARROWS.

SPECIFICATION forming part of Letters Patent No. 624,582, dated May 9, 1899.

Application filed November 23, 1896. Serial No. 613,233. (No model.)

*To all whom it may concern:*

Be it known that I, JOSEPH TUCKER, a citizen of the United States, residing at Julian, in the county of Nemaha and State of Nebraska, have invented a new and useful Sulky Attachment for Harrows, of which the following is a specification.

My invention relates to certain improvements for sulky-harrows, the object being to provide means for elevating and carrying the harrow proper by means connected to the axle acting as a windlass; and another object of the invention is to provide certain improved means for the adjustment of the harrow.

With these objects in view my invention consists in the peculiar construction of the various parts and in their novel combination and arrangement, all of which will be fully described hereinafter and pointed out in the claim.

Figure 1:
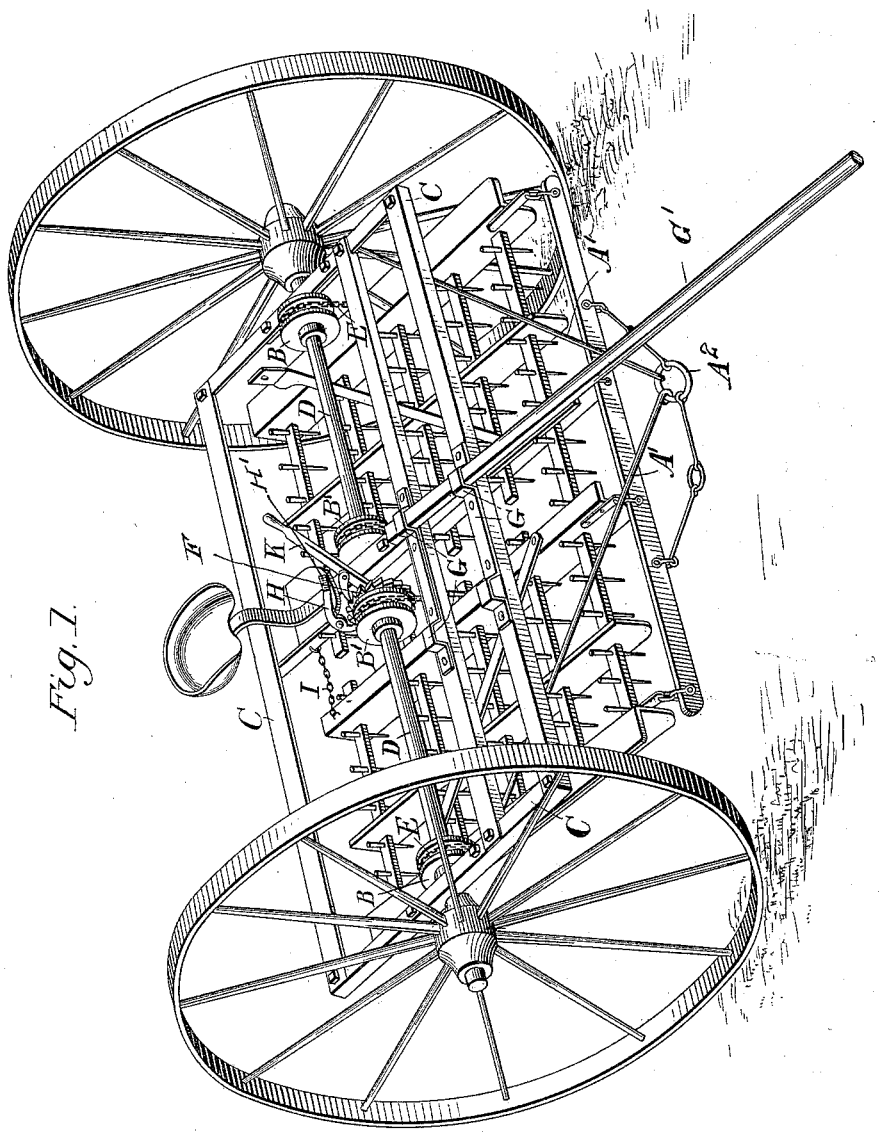
Figure 2:
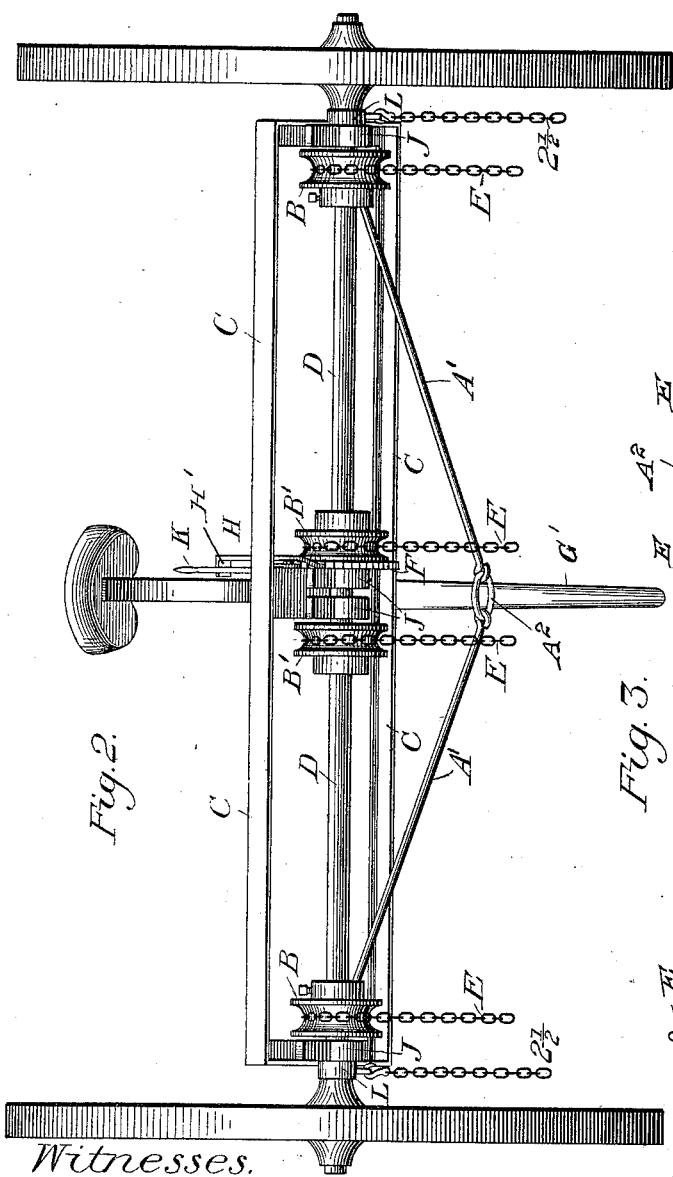
Figure 3:
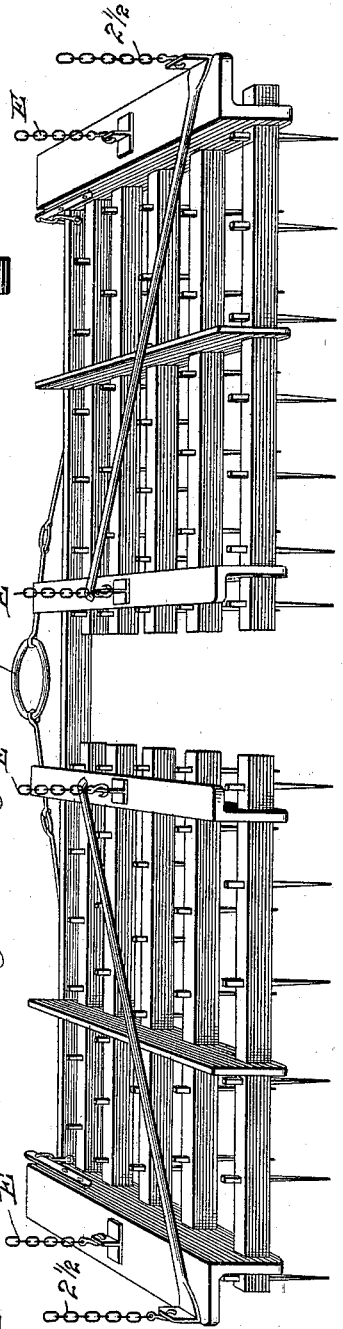

In the drawings forming part of this specification, Figure 1 is a perspective view of a harrow constructed in accordance with my invention. Fig. 2 is a rear view, the harrow proper being detached. Fig. 3 is a partial plan view of the harrow from the rear.

In carrying out my invention I employ an essentially rectangular-shaped frame C, preferably constructed of angle-iron, said frame resting upon a tubular axle D, and is provided with suitable bearings J for this purpose. Winding spools or drums B' are mounted upon the tubular axle D, and elevating-chains E are attached to said spools or drums and also to the harrow proper for the purpose of raising and lowering the sections of the harrow. In order to operate the said drums, I employ a ratchet F, which is made fast to one of the central drums and is operated through the medium of a lever K, a pawl H being employed to lock the drums in any desired position, said pawl being provided with a pedal H', by means of which the operator can quickly and easily throw the pawl out of engagement with the ratchet. The harrow proper consists of a series of longitudinal beams carrying the toothed bars, and are arranged in two sections, connected by the chain I at their rear ends and to a draft-beam at their forward ends. Draft-rods A' are attached to said draft-beam and connect a ring $A^2$, and rods A are also connected to said ring $A^2$ and extend to the forward portion of the main frame C. Suitable sockets G are arranged upon the main frame for the purpose of securing the tongue G'. Collars L are arranged near the ends of the axle, and to which guide-chains $2\frac{1}{2}$ are attached, said chains connecting with the harrows for the purpose of maintaining them in their proper relative positions.

The operation of my device is apparent to everyone, and it will be seen that I provide an exceedingly simple construction of harrow which can be adjusted as desired through the medium of the winding-drums arranged upon the tubular axle and the chains attached thereto.

Having thus fully described my invention, what I claim as new, and desire to secure by Letters Patent of the United States, is—

In a sulky-harrow, the combination with the ground-wheels and tubular axle, of the main frame supported thereon, the winding drums or spools mounted upon said axle, the elevating-chains attached to the drums and to the harrow for elevating the same, the ratchet F, secured on one of the central drums and a lever and pawl for operating said ratchet, the locking-pawl having a foot-piece and the draft-rods attached to the main frames and adapted to operate substantially as described.

JOSEPH TUCKER.

Witnesses:
A. J. BURNHAM,
W. H. HILL.